United States Patent [19]

Michiya et al.

[11] Patent Number: 5,600,532
[45] Date of Patent: Feb. 4, 1997

[54] THIN-FILM CONDENSER

[75] Inventors: Arakawa Michiya; Takada Toshikatsu, both of Nagoya, Japan

[73] Assignee: NGK Spark Plug Co., Ltd., Nagoya, Japan

[21] Appl. No.: 419,408

[22] Filed: Apr. 10, 1995

[30] Foreign Application Priority Data

Apr. 11, 1994 [JP] Japan .................................. 6-098179

[51] Int. Cl.$^6$ .................................................. H01G 9/008
[52] U.S. Cl. ........................ 361/305; 361/321.2; 361/313; 361/311; 361/301.1
[58] Field of Search ........................ 361/322, 323, 361/310, 313, 321.2, 305, 310; 29/25.42; 205/122

[56] References Cited

U.S. PATENT DOCUMENTS

| | | | |
|---|---|---|---|
| 3,969,197 | 7/1976 | Tolar et al. ........................... | 205/122 |
| 4,364,099 | 12/1982 | Koyama et al. ...................... | 361/305 |
| 4,985,802 | 1/1991 | Ueno et al. .......................... | 361/302 |
| 5,168,421 | 12/1992 | Suzuki et al. ....................... | 361/323 |

FOREIGN PATENT DOCUMENTS 52-53257  4/1977  Japan .
60-55975  12/1985  Japan .

Primary Examiner—Leo P. Picard
Assistant Examiner—Anthony Dinkins
Attorney, Agent, or Firm—Foley & Lardner

[57] ABSTRACT

In a thin-film condenser, a lower electrode surface layer section forming a surface in contact with a thin-film dielectric layer is made of a metal having a recrystallization temperature Tr equal to or higher than 623 K., or made of a metal having a melting point Tm equal to or higher than 1780 K. An example of such a metal is a Ni—Fe alloy containing 30% of Ni or more.

21 Claims, 3 Drawing Sheets

RELATION BETWEEN Ni CONTENT IN Fe-Ni (γ-PHASE) ALLOY
AND COEFFICIENT OF THERMAL EXPANSION

THIN-FILM CONDENSER

BACKGROUND OF THE INVENTION

1. Field of the Invention

The present invention relates in general to a thin-film condenser formed on the surface of an insulation substrate and more specifically to a thin-film condenser having a lower electrode layer with a view to improving the heat-resisting property of the condenser.

2. Description of the Prior Art

By recent development in the integrated circuit technology, the operating frequency of the integrated circuit has been elevated remarkably for the reason of a high-speed operation thereof. This is attended with, in order to prevent an erroneous operation of the integrated circuit due to noise, a practice of installing or forming a decoupling condenser on a ceramic substrate or the like insulation substrate.

It has been considered, notwithstanding the condenser is required to have a relatively large electrostatic capacity, to form the condenser on the insulation substrate adjacent the integrated circuit for the reason of the insulation substrate of itself being required to be compact and for the reason of the properties of the condenser.

In this instance, in order that a larger electrostatic capacity can be attained in a limited area, it is required to make thinner the thickness of the dielectric layer, so that a thin-film dielectric layer is formed by sputtering, CVD (chemical vapor deposition) method, sol-gel method, LB(Langmuir-Blodgett) film method or the like thin-film forming method.

Of those methods, well known as disclosed in Japanese patent application laid-open publication 52-53257, Japanese patent application after examination publication 60-55975, etc. is a method comprising the steps of forming a thin-film from Ta (tantalum) or the like metal that can carry out anodic oxidation, by sputtering or the like on an insulation substrate, and thereafter making the thin-film carry out anodic oxidation by using citric acid solution of the density of 0.1% for instance, for thereby forming a lower electrode made of Ta and a dielectric layer made of $Ta_2O_5$. The method further comprises the step of forming on the dielectric layer an upper electrode of Ta, Al or the like metal by sputtering or the like method, for thereby forming a thin-film condenser.

Thereafter, the insulation substrate is subjected to a heat treatment at about 300°~500° C. for forming an insulation layer by curing of polyimide or the like, or for installation of a semiconductor chip (die attach), or for closure by a lid or cover. Accordingly, a thin-film condenser formed on an insulation substrate is also required to have a heat-resisting property.

However, in case of the thin-film condenser formed by the above described prior art method, Ta in the lower electrode is diffused into the dielectric layer made of $Ta_2O_5$ by heat, thus causing the dielectric layer to exhibit a conductive property.

Since the thin-film dielectric layer is thin, the insulation property of the thin-film dielectric layer of itself is lowered by such transformation, so the condenser cannot fully exhibit a required property.

Accordingly, it has been impossible to attain a heat-resisting property above 300° C.

In view of such a problem, with a view to preventing diffusion of Ta, etc., a search was conducted by the applicant on the heat-resisting property of the condenser by forming the upper and lower electric layers from Cu(copper), Ag(silver), or the like metal that does not cause diffusion with $Ta_2O_5$ and forming the thin-film dielectric layer from $Ta_2O_5$.

However, such a condenser is conversely lowered in the insulation property to cause a problem of a short circuit defect, resulting in that it was impossible to improve the heat-resisting property of the condenser.

This is because the crystals of Cu (copper), etc. in the electrode layers grew into grains at the temperature of 200°~250° C. so than movement of the Cu atoms, etc. was caused to damage the thin-film dielectric layer in contact with those atoms. Further, Cu and Ag are larger in coefficient of thermal expansion as compared with the dielectric layer, so it is considered that it was due to an influence of thermal stress that was caused between the thin-film dielectric layer and each electrode layer.

Furthermore, the damage of the thin-film dielectric layer was caused more pronouncedly by the grain growth and thermal stress of the lower electrode layer.

Because the upper electrode layer was constituted by a plurality of smaller electrode sections with a view to making smaller the influence of the short circuit defect of the condenser caused by the defect of the dielectric layer.

That is, the small electrode sections constituting the upper electrode layer, are smaller in the size of electrode as compared with the lower electrode layer so that the lower electrode layer becomes larger in the influence of grain growth and thermal stress on the dielectric layer.

SUMMARY OF THE INVENTION

According to an aspect of the present invention, there is provided a novel and improved thin-film condenser which comprises a lower electrode layer formed on an insulation substrate, a thin-film dielectric layer formed on the lower electrode layer, and an upper electrode layer formed on the thin-film dielectric layer, wherein of the lower electrode layer at least a lower electrode surface layer section forming a surface in contact with the thin-film dielectric layer is made of a metal having a recrystallization temperature equal to or higher than 623 K.

According to another aspect of the present invention, the lower electrode surface layer section of the lower electrode layer is made of a metal having a melting point equal to or higher than 1780 K.

According to a further aspect of the present invention, the metal which the lower electrode surface layer section is made of, has a coefficient of thermal expansion equal to or lower than $13 \times 10^{-6}$/K.

According to a further aspect of the present invention, the lower electrode surface layer section of the lower electrode layer is made of a Ni—Fe alloy containing 30% of Ni or more.

According to a further aspect of the present invention, the lower electrode surface layer section of the lower electrode layer is made of a Ni—Fe alloy containing 30~70% of Ni.

According to a further aspect of the present invention, at least a lower electrode base layer section of the lower electrode layer is made of a Ni—Fe alloy containing 30~70% of Ni.

According to a further aspect of the present invention, the lower electrode surface layer section of the lower electrode is made of a Ni—Fe alloy containing 40~70% of Ni.

Generally, the phenomenon that when a cold-worked crystalline material is annealed at a suitable high temperature, new grains result from old grains so that the entirety of the material is constituted by a new crystalline structure, is known as recrystallization, and the lower limit temperature at which the recrystallization occurs is called a recrystallization temperature Tr.

In case of the metal forming the upper and lower electrodes of a condenser by plating, sputtering or the like, grain growth is caused by heating, so the temperature at which grain growth begins (hereinafter referred to as grain growth beginning temperature can be considered as being approximate to the recrystallization temperature Tr.

In this connection, a recrystallization temperature Tr of a metal is considered as being nearly proportional to the melting point Tm of the metal and known as being about 35~59% of the melting point Tm by the expression of absolute temperature as disclosed in pages from 114 to 122 of "Metallography" published by Maruzen Co., Ltd. on February 1993.

Accordingly, the grain growth beginning temperature Tg is considered as being nearly equal to the recrystallization temperature Tr.

For example, the recrystallization temperature Tr or the grain growth beginning temperature Tg of Cu (copper) whose melting point Tg is 1356 K., is about 473~503 K. (=200°~230° C.), and the recrystallization temperature Tr or the grain growth beginning temperature Tg of Ag (silver) whose melting point Tm is 1234 K., is about 470 K. (=200° C.) according to the table 5.4 of the above described "Metallography".

On the other hand, according to the above described table, the recrystallization temperature Tr or the grain growth beginning temperature of Ni (nickel) whose melting point Tm is 1726 K., is determined as 803~933 K. (=530°~660° C.) which is 46~54% of the melting point Tm, and the grain growth beginning temperature Tg of Pt (platinum) whose melting point Tm is 2042 K. is determined as 723 K. (=450° C.) or less.

Accordingly, by forming, of sections of the lower electrode, at least a lower electrode surface layer section in contact with the thin-film dielectric layer from a material of a high recrystallization temperature Tr or a high grain growth beginning temperature Tg, it becomes possible to prevent movement of atoms accompanying grain growth or hold it to low.

That is, by using a metal having a recrystallization temperature Tr or a grain growth beginning temperature Tg of 623 K. (=350° C.) or higher for forming the lower electrode surface layer section, grain growth is not caused even by heating above 350° C. or it is small even if caused.

Similarly, in case of a metal having a melting point Tm of 1780 K. (=1507° C.) or higher, grain growth is not caused even by heating above 350° C. or it is small even if caused since the recrystallization temperature Tr or the grain growth beginning temperature Tg is higher than 623 K. (=350° C.) even in the case Tr or Tg is determined as being 35% of the melting point Tm.

Further, in case the lower electrode surface layer section is made of a metal having a relatively low coefficient of thermal expansion equal to or lower than $13 \times 10^{-6}/°$ C., it becomes possible to reduce the thermal stress between the thin-film dielectric layer and the lower electrode surface layer section due to the difference of thermal expansion caused by heating.

The thin-film dielectric layer is, for example, made of a metal oxide such as $Ta_2O_5$ or a nitride such as $Si_3N_4$ and generally has a coefficient of thermal expansion lower than those of metals.

On the other hand, in case, of the sections of the lower electrode layer, at least the lower electrode surface layer section is made of a Ni—Fe alloy containing 30% of Ni or more, it becomes possible to provide the lower electrode surface layer with a coefficient of thermal expansion lower than that of only Ni or Fe whilst allowing the same to have a high melting point or a high grain growth beginning temperature.

Furthermore, since the coefficient of thermal expansion of the lower electrode surface layer section can be varied largely depending upon variations of the Ni content, it becomes possible to make the heat-resisting property of the condenser optimum by selecting a suitable Ni content in accordance with the materials, etc. of the thin-film dielectric layer, insulation substrate and the lower electrode surface layer section.

In this instance, in case the lower electrode surface layer section and the lower electrode base layer section are made of a Ni—Fe alloy containing 30~70% of Ni, it becomes possible to further reduce the thermal stress between the surface layer section and the base layer section.

Further, in case the lower electrode surface layer section is characterized by being made of a Ni—Fe alloy containing 40~70% of Ni, it becomes possible to reduce the coefficient of thermal expansion of the surface layer section for thereby approximating the same to that of the thin-film dielectric layer, while on the other hand, since the coefficient of thermal expansion does not become extremely smaller, the thermal stress between the lower electrode surface layer section and the lower electrode base layer section does not become so large even when the lower electrode base layer section is made of a material having a high coefficient of thermal expansion such as Cu.

The above structure is effective for solving the above noted problem inherent in the prior art device.

It is according an object of the present invention to provide a novel and improved thin-film condenser which has an excellent heat-resisting property.

It is a further object of the present invention to provide a novel and improved thin-film condenser which can attain a high yielding rate and can be produced at a low cost.

DETAILED DESCRIPTION OF THE INVENTION

Referring to FIGS. 1 to 4, a thin-film condenser according to the present invention will be described.

Example 1

Figure 1:
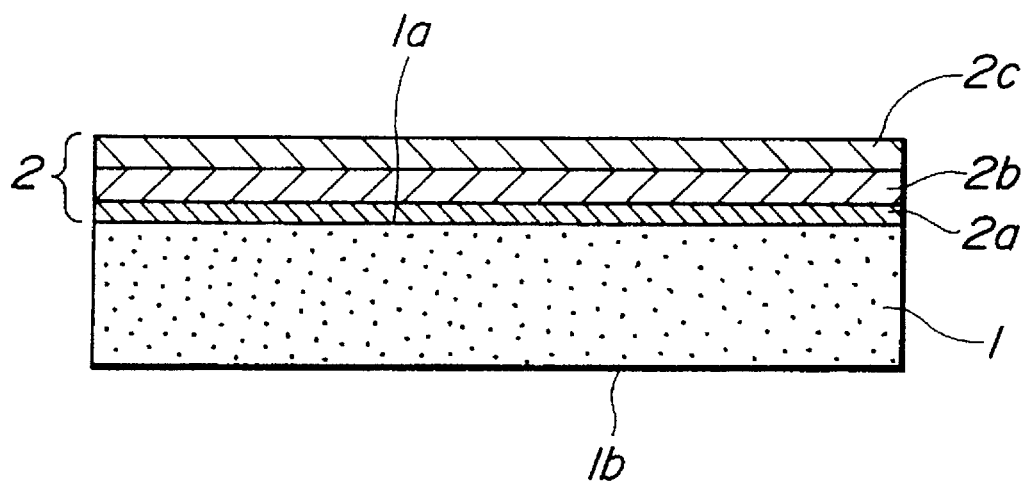
FIG. 1 is a sectional view of a lower electrode layer of a thin-film condenser to which the present invention is directed, formed on an insulation substrate.

On the entirety of a main surface 1a of an insulation ceramic substrate 1 which is made of 92% alumina and is 50 mm square and 2 mm thick, a lower electrode connecting layer section 2a of Ti(titanium) (0.2 μm thick) and Cu (0.5 μm thick) is formed by sputtering, and then formed thereon are a lower electrode base layer section 2b of Cu (7 μm thick) and a lower electrode surface layer section 2c of Ni (3 μm thick) by electroplating, for thereby forming a lower electrode layer 2 consisting of three layer sections 2a, 2b and 2c as shown in FIG. 1.

In this instance, the lower electrode connecting layer section 2a is provided for the purpose of improving the adhering or bonding property with respect to the insulation substrate 1 and providing a conductivity for enabling electroplating.

The lower electrode base layer section 2b is provided for the purpose of increasing the overall thickness of the lower electrode layer 2 and improving the electric characteristics of the condenser by using a metal of low specific resistance for thereby lowering the resistance possessed by the lower electrode 2 of itself of the condenser.

In the above described example, with a view to lowering the inductance of the electrode, Cu which is 5 low in resistance and is a non-magnetic metal, is used, and electroplating capable of increasing the thickness of the electrode with ease, is used as a method for forming the electrode.

The lower electrode surface layer section 2c is formed so as to be in contact with the lower electrode base layer section 2b and constitute a surface section of the lower electrode layer 2 and is, in this embodiment, made of a metal of a high recrystallization temperature, i.e., Ni whose grain growth beginning temperature is high.

The thicknesses of the lower electrode base layer section 2b and the lower electrode surface layer section 2c are determined in accordance with the required resistance of the lower electrode layer 2, the materials of the base layer section 2b and the surface layer section 2c, etc. In this example, Cu used for the base layer section 2b is relatively high in coefficient of thermal expansion and the thickness of the base layer section 2b is large (i.e., 7 μm thick), so the thickness of the surface layer section 2c is made a little larger (3 μm thick) for thereby preventing a crack or cracks from being caused in the surface layer section 2c due to the difference in coefficient of thermal expansion therebetween.

Further, by forming the base layer section 2b and the surface layer section 2c by electroplating, the plating grains grow in such a manner as to fill up the pores, flaws or the like defects existing on the surface 1a of the insulation substrate 1, so the surface of the surface layer section 2c is made smoother as compared with a substrate having uneven portions due to surface defects.

Figure 2:
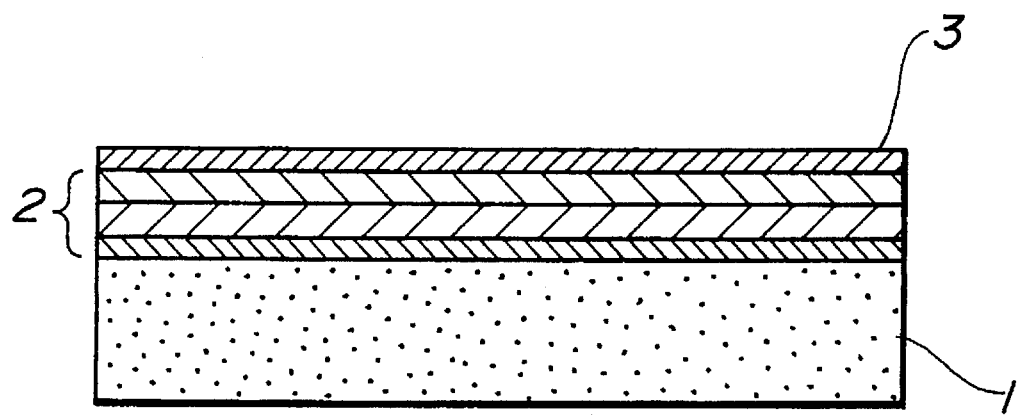
FIG. 2 is a view similar to FIG. 1 but shows the lower electrode layer in a state of having formed thereon a thin-film dielectric layer.

Then, a thin-film dielectric layer 3 of $Ta_2O_5$ (0.3 μm thick) is formed on the lower electrode layer 2 by sputtering as shown in FIG. 2.

Further, an upper electrode connecting layer section 4a of Mo (0.3 μm thick) and Cu (0.5 μm thick) is formed by sputtering, and then a photoresist pattern each having a plurality of openings each of which is 1.27 mm square and which are disposed at intervals of 1.27 mm are formed on the upper electrode connecting layer section 4a by a photolithographic technique.

Figure 3:
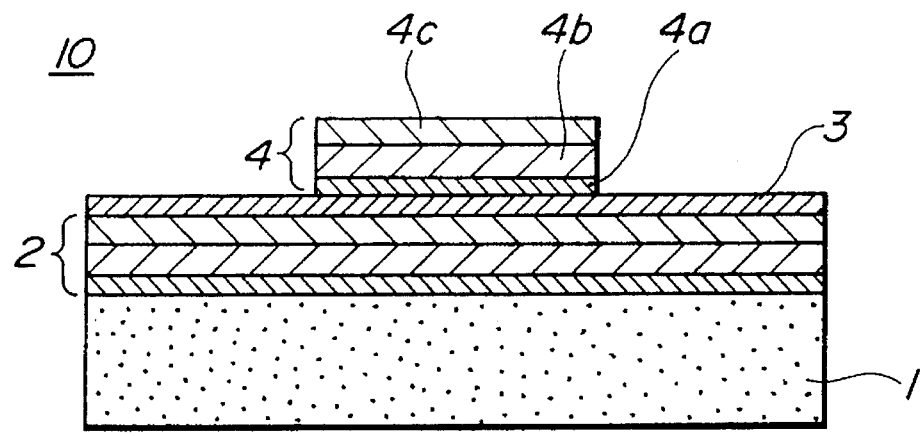
FIG. 3 is a sectional view of an upper electrode layer formed on the dielectric layer of FIG. 2 for thereby constituting a thin-film condenser to which the present invention is directed.
Figure 4:
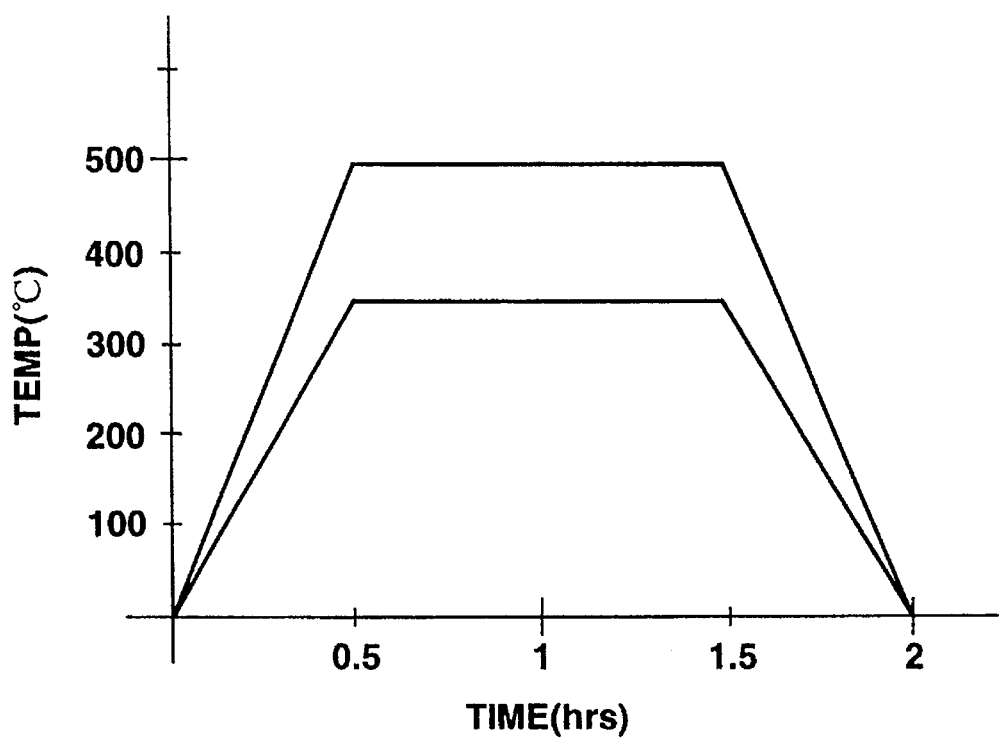
FIG. 4 is a graph for illustration of a heating schedule of an oven used for searching a heat-resisting property of a thin-film condenser.

Thereafter, an upper electrode base layer section 4b of Cu (5 μm thick) and an upper electrode surface layer section 4c of Ni (2 μm thick) are formed at each of the openings by electroplating for thereby forming an upper electrode 4 consisting of three layer sections 4a, 4b and 4c, and in a final stage the resist pattern is first removed and then an unnecessary portion of the sputtering coating of Mo—Cu is removed by etching for thereby completing a thin-film condenser 10 as shown in FIG. 3. In this instance, the upper electrode layer 4 is divided so that the thin-film condenser 10 is made up of small condenser sections arranged in lines of sixteen and in columns of sixteen so as to be 256 in total and formed on the single insulation substrate 1.

The reason why such small condenser sections are to be formed is that when the thin-film dielectric layer 3 or the lower electrode layer 2 is defective, a short circuit defect of the condenser is liable to be caused, that is, even if a condenser is defective at one place only, the overall condenser is put into a short circuit condition, so the yield rate of the condenser is lowered. For this reason, the upper electrode is divided so as to constitute a plurality of small condenser sections, so that only good small condenser sections having no defect are selected and used to constitute a condenser having a desired electrostatic capacity for thereby improving the reliability and the yield rate.

In this instance, the upper electrode connecting layer section 4a is provided for improving the adherence of the upper electrode layer 4 to the thin-film dielectric layer 3 and for attaining the conductivity for making it possible to perform electroplating.

The upper electrode base layer section 4b is provided for increasing the thickness of the upper electrode layer 4 similarly to the lower electrode base layer section 2b and reducing the resistance which the upper electrode layer 4 of itself possesses, by using a metal of a low resistivity, for thereby improving the electric characteristics of the condenser.

On the other hand, differing from the lower electrode surface layer section 2c, there is no necessity of considering the upper electrode surface layer section 4c in relation to the thin-film dielectric layer 3, so it is rather for the purpose of preventing oxidation of the upper electrode layer 4 and for selectively etching the Mo—Cu sputtering layer to use Ni for the upper electrode surface layer section 4c.

As will be understood from the above, in this example, the upper electrode base layer section 4b and the upper electrode surface layer section 4c are smaller in size as compared with the lower electrode layer 2, so the grain growth beginning temperature and the coefficient of thermal expansion of these materials are negligible or inconsiderable as compared with those of the lower electrode layer 2.

Thin-film condensers of the kind wherein only a lower electrode surface layer section 2c was made of Pt or Ni—W alloy (Ni=60%) were prepared to use as examples.

Further, comparative examples of the kind wherein only a lower electrode surface layer section 2c was made of Cu or Ag were prepared.

In the meantime, it is to be noted that in the above described Ni-plating and Ni—W alloy plating several percentages of Co (cobalt) is inevitably contained as an impurity.

Then, the completed thin-film condenser 10 was tested for the heat-resisting property in the following manner.

The result of the test at the maximum temperature of 350° C. is shown in samples Nos. 1 to 5 in Table I.

TABLE I

| | SAMPLE No. | MATERIAL OF LOWER ELECTRODE SURFACE LAYER SECTION 2c | MELTING POINT Tm K | RECRYSTAL- LIZATION TEMP. Tr K | COEFICIENT OF THERMAL EXPANSION $\times 10^{-6}$/K (273–373K) | INSULATION RESISTANCE PASSED/ SAMPLES | AP- PEARANCE PASSED/ SAMPLES | JUDGE- MENT[*2] |
|---|---|---|---|---|---|---|---|---|
| INVEN- TION | 1 | Ni | 1728 | 803–933 | 13.3 | 220/220 | 220/220 | o |
| | 2 | Pt | 2045 | ~723 | 9.0 | 215/215 | 215/215 | o |
| | 3 | Ni(60%)—W | 1783 | UNCERTAIN | 6.5[*1] | 218/218 | 218/218 | o |
| COMPAR- ATIVE EXAMPLE | 4 | Cu | 1356 | 473–503 | 16.2 | 0/223 | 0/223 | x |
| | 5 | Ag | 1234 | ~473 | 19.7 | 0/216 | 0/216 | x |

In the table, [*1] Indicates that the coefficient of thermal expansion corresponds to the temperature range of 273–1173K. [*2] indicates that the judgement of o (good) was made when the sample passed both the insulation and appearance tests, and x means not good. "PASSED/SAMPLES" means the number of samples passed the test/the total number of samples subjected to the test.

Firstly, the lower electrode layer 2 of the thin-film condenser 10 having been completed as above is used as a common electrode, and the insulation resistances between the common electrode and the respective small electrode sections into which the upper electrode layer 4 is divided, were measured, whilst at the same time the appearance of the electrode, such as peeling, etc., was inspected, whereby a good condenser is selected. Then, the thin-film condenser 10 was put in an oven and heated at the maximum temperature of 350° C. according to a temperature schedule shown in FIG. 4 to perform the following tests and thereafter heated at the temperature of 500° C., that is, two kinds of heating were made.

In the meantime, the maximum temperature was set to 350° C. by consideration of the case of die-attach of a semiconductor chip by using Au—Sn solder, the case of curing an epoxy resin for forming an insulation layer, and the soldering temperature at the time of installation of the substrate on an electronic device.

On the other hand, the maximum temperature was set to 500° C. by consideration of the temperature applied to the thin-film condenser 10 at the curing process or firing process in case of manufacturing a multi-layer wiring board or the like by forming, after the thin-film condenser 10 was formed, an insulation layer. or the like made of polyimide, glass or the like on the thin-film condenser 10 or the rear surface 1b of the insulation substrate 1, or by consideration of the case of die-attach by using Au—Ge solder or Au—Si solder.

After heating at the respective temperatures of 350° C. and 500° C., the samples were taken out from the oven and inspected for the insulation resistance and any peeling of a thin-film condenser 10 which had been good before the test.

In this connection, regarding the insulation resistance, the samples were judged as standing or passing the test when they satisfied the condition that their insulation resistance were equal to or more than 30MΩ when applied by 25 volts for 3 seconds. Regarding the appearance of the condenser, the samples were judged as standing or passing the test when they satisfied the condition that any "peeling" or any "swelling" of the electrode or the dielectric layer was not observed.

In the meantime, while 256 small condenser sections were formed in each sample, some small condenser sections had a defect of short circuit or the like before the heating test due to a defect of the substrate or the like, so the number of small condenser sections actually used for the test at each sample was around 220.

From Table I, it will be understood that the samples Nos. 1 and 2 whose lower electrode surface layer section 2c is made of a material of a recrystallization temperature Tr equal to or higher than 350° C. and the samples of Nos. 2 and 3 whose lower electrode surface layer section 2c is made of a metal having a melting point Tm equal to or higher than 1780 K. are good both at the insulation resistance and the appearance, differing from the comparative examples Nos. 4 and 5 using Cu and Ag, and therefore can withstand the heating at the temperature of 350° C.

This is because the metal whose recrystallization temperature Tr is high, has a high grain growth beginning temperature Tg which is considered as assuming a similar value to the crystalline temperature or because the metal whose melting point Tm is high, is high in both recrystallization temperature Tr and grain growth starting temperature For example, in case of Ni, the recrystallization temperature is in the range from 530° C. to 660° C., so the grain growth beginning temperature Tg assumes a similar value. Accordingly, it is considered that such heating at the temperature of 350° C. or so does not cause grain growth or cause grain growth to only a small extent such that damage of the thin-film dielectric layer 3 is not caused.

In case of Pt (platinum) of the sample No. 2, the melting point Tm is high and the recrystallization temperature Tr is high as being 450° C. or lower, so it is also considered that heating at the temperature of 350° C. or so does not cause grain growth or cause grain growth to only a small extent such that damage of the thin-film dielectric layer 3 is not caused.

This is similar in case of a Ni—W alloy of the sample No. 3.

Similarly, the result of the heating test at the temperature of 500° C. is shown in Table II.

TABLE II

| SAMPLE No. | MATERIAL OF LOWER ELECTRODE SURFACE LAYER SECTION 2c | MELTING POINT Tm K | RECRYSTAL- LIZATION TEMP. Tr K | COEFICIENT OF THERMAL EXPANSION ×10$^{-6}$/K (273-373K) | INSULATION RESISTANCE PASSED/ SAMPLES | AP- PEARANCE PASSED/ SAMPLES | JUDGE- MENT*[2] |
|---|---|---|---|---|---|---|---|
| INVEN- TION 1 | Ni | 1728 | 803~933 | 13.3 | 112/220 | 130/220 | x |
| 2 | Pt | 2045 | ~723 | 9.0 | 215/215 | 215/215 | o |
| 3 | Ni(60%)—W | 1783 | UNCERTAIN | 6.5*[1] | 218/218 | 218/218 | o |
| COMPAR- ATIVE EXAMPLE 4 | Cu | 1356 | 473~503 | 16.2 | 0/223 | 0/223 | x |
| 5 | Ag | 1234 | ~473 | 19.7 | 0/216 | 0/216 | x |

In the table, *[1] indicates that the coefficient of thermal expansion corresponds to the temperature range of 273~1173K. *[2] indicates that the judgement of o (good) was made when the sample passed both the insulation and appearance tests, and x means not good. "PASSED/SAMPLES" means the number of samples passed the test/the total number of samples subjected to the test.

In Table II, differing a little from Table I, a defect was caused in case of the sample No. 1 where Ni was used.

It is considered that although the recrystallization temperature Tr of Ni is higher than that of Pt, the coefficient of thermal expansion of Ni is large as being $13 \times 10^{-6}$/° C., so the difference in thermal expansion between the lower electrode of Ni and the thin-film dielectric layer 3 of $Ta_2O_5$ becomes large such that damage of the thin-film dielectric layer 3 was resultantly caused.

On the other hand, it is considered that although in case where Pt is used for the lower electrode surface layer section 2c, heating at the temperature of 500° C. which exceeds the recrystallization temperature Tr (450° C. or less) was made, the temperature difference between the heating temperature of 500° C. and the recrystallization temperature Tr of Pt is small and further the coefficient of thermal expansion of the lower electrode surface layer section 2c is equal to or smaller than $13 \times 10^{-6}$/° C. such that the difference in thermal expansion between the lower electrode surface layer section 2c and the thin-film dielectric layer 3 does not become so large as to cause a defect.

Similarly, in case of the sample No. 3 where a Ni—W alloy is used, the recrystallization temperature Tr is not definite but since both of Ni and W are high in recrystallization temperature Tr it is assumed that the recrystallization temperature Tr of the Ni—W alloy is high. Furthermore, the melting point Tm is high as being 1783 K. (=1510° C.), so it is considered that recrystallization is not caused or it is difficult to cause recrystallization by heating at the temperature of 500° C. Furthermore, the coefficient of thermal expansion of the Ni—W alloy is considerably low, so it is considered that the difference in thermal expansion between the lower electrode surface layer section 2c and the thin-film dielectric layer 3 does not become so high as to cause a defect.

Accordingly, in case Ni is used for the lower electrode surface layer section 2c, the condenser after being completed can withstand heating at the temperature of 350° C. or so.

Particularly, Ni is inexpensive and hard to be oxidized, so it becomes easier to handle the product during the time after the lower electrode layer 2 is completed and until the thin-film dielectric layer 3 is formed.

On the other hand, in order that the lower electrode surface layer section 2c can withstand heating at the temperature of 500° C. or so, it is necessary to use Pt or a Ni—W alloy for forming the lower electrode surface layer section 2c. Of those materials, Pt is advantageous for the reason that it is non-magnetic and can reduce the inductance of the electrode, etc., though it is expensive.

Further, although a search was not conducted in the above described example, other materials such as Ni—Mo, Pd, Cr and alloys of those metals can be used for forming the lower electrode surface layer section 2c.

Though Pd is a little expensive, it has an advantage that it is not oxidized. Further, Cr enables to obtain a hard electrode but it makes it difficult to obtain a uniform plating and has a possibility of causing a crack or cracks when the thickness of the coating becomes larger than 1 µm or so.

The material of the lower electrode surface layer section 2c can be determined suitably by consideration of the desired characteristics and cost of the condenser and the material of the lower electrode base layer section 2b.

In this instance, the coefficient of thermal expansion in Tables I and II represents principally an average value in the range of 0°~100° C.

This is because no document was found which definitely shows the coefficients of thermal expansion of the metals used in the test with respect to the range of the temperature of 0°~350° C. and the range of the temperature of 0°~500° C. and further because variation of thermal expansion generally occurs monotonously along a straight line or along a exponential function curve and so it is easily supposed that the material having a large coefficient of thermal expansion in the temperature range of 0°~100° C. has a large coefficient of thermal expansion in the temperature range up to 350° C. or 500° C.

Accordingly, in the present invention, the coefficient of thermal expansion for the temperature range of 0°~100° C. is used.

Example 2

Figure 5:
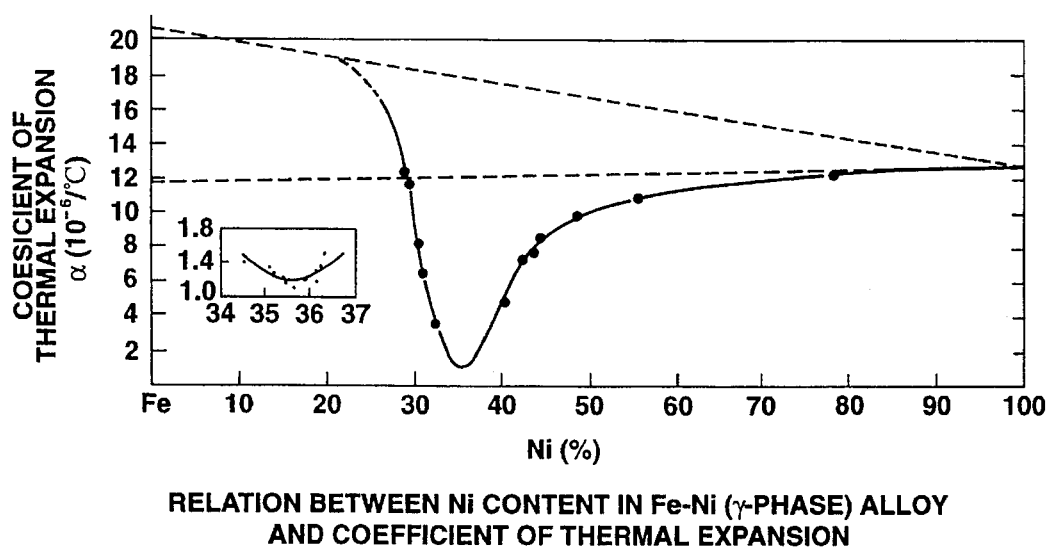
FIG. 5 is a graph of a relation of Ni content of Ni—Fe alloy and coefficient of thermal expansion.

Regarding Ni—Fe alloy, it is known as shown in the graph of FIG. 5 that its coefficient of thermal expansion can be varied largely depending upon a variation of its Ni content.

Thus, a thin-film condenser 10 was produced by changing, in the thin-film condenser similar to the above described example 1, the material of the lower electrode base layer section 2b from Cu to Ni—Fe so as to be the same as that of the lower electrode surface layer 2c, i.e., by not forming a base layer 2b of Cu but using Ni—Fe alloys which are varied in Ni content accordingly, and by forming the surface layer 2c of the thickness of 10 µm by electroplating.

Thereafter, the heat-resisting property of the thin-film condenser 10 was tested in the similar manner to the above described example 1.

11

In the meantime, the melting point with respect to each of the compositions of Ni—Fe alloys could not be recognized.

However, it is considered that the melting point Tm is not different so largely from the melting point of Ni (1726 K.) and the melting point of Fe (1810 K.) and the grain growth beginning temperature Tg is about 530°~660° C. similarly to the case of Ni.

The result of the test at the temperature of 350° C. and 500° C. is shown in Table III.

As will be understood from Table III, in case the Ni content of the Ni—Fe alloy is equal to or larger than 30%, the thin-film condenser formed by using this alloy is resistant to heating at the temperature of 350° C. or higher. It is considered that this is because, as described as above, the grain growth beginning temperature of the Ni—Fe alloy is assumed to be 600° C. or so and the coefficient of thermal expansion is low.

In the meantime, in case the Ni content is equal to or lower than 25%, it is considered that the crystal structure of the alloy was transformed into a martensitic structure to make larger the coefficient of thermal expansion so that a crack or cracks were caused in the lower electrode layer.

12

In the meantime, while, in this example, the lower electrode base layer section 2b is formed of the same Ni—Fe alloy as the lower electrode surface layer section 2c so resultantly a single layer (surface layer) having no boundary between the base layer section and the surface layer section is formed, it will do to form the base layer section 2b and the surface layer section, 2c from different Ni—Fe alloys of suitable compositions, respectively. In such a case, the thermal stress resulting between the both does not become so large, and the difference in thermal expansion between the lower electrode surface layer section 2c and the thin-film dielectric layer 3 can be made smaller.

Example 3

In order to examine a Ni—Fe alloy in relation to the lower electrode base layer section 2b, various thin-film condensers 10 similar to the above described example 1, were produced by forming the lower electrode base layer section 2b of a Cu-plating layer of 7 μm thick similarly to the example 1 and by using Ni—Fe alloys whose Ni contents were varied suitably as the material of the lower electrode surface layer section 2c, and the thus produced thin-film condensers 10

TABLE III

| | MATERIAL OF SURFACE/ BASE LAYER SECTION | | COEFICIENT OF THERMAL EXPANSION | MAXIMUM TEMP. | | | | |
|---|---|---|---|---|---|---|---|---|
| | | | | 350° C. | | 500° C. | | |
| | | | | INSULATION RESISTANCE | APPEARANCE | INSULATION RESISTANCE | APPEARANCE | |
| SAMPLE No. | Ni % | Fe % | (×10⁻⁶/K) 273–373K | PASSED/ SAMPLES | PASSED/ SAMPLES | PASSED/ SAMPLES | PASSED/ SAMPLES | JUDGE- MENT |
| 6 | 100 | 0 | 13.3 | 220/220 | 220/220 | 113/220 | 120/220 | Δ |
| 7 | 90 | 10 | 12.8 | 219/219 | 219/219 | 110/219 | 115/219 | Δ |
| 8 | 80 | 20 | 12.2 | 215/215 | 215/215 | 108/215 | 108/215 | Δ |
| 9 | 70 | 30 | 12.0 | 220/220 | 220/220 | 220/220 | 220/220 | o |
| 10 | 60 | 40 | 11.8 | 215/215 | 215/215 | 215/215 | 215/215 | o |
| 11 | 50 | 50 | 10.0 | 218/218 | 218/218 | 218/218 | 218/218 | o |
| 12 | 40 | 60 | 6.0 | 213/213 | 213/213 | 213/213 | 213/213 | o |
| 13 | 35 | 65 | 1.3 | 221/221 | 221/221 | 221/221 | 221/221 | o |
| 14 | 30 | 70 | 8.0 | 220/220 | 220/220 | 220/220 | 220/220 | o |
| 15 | 25 | 75 | 17.0 | 130/217 | 130/217 | 5/217 | 5/217 | x |
| 16 | 20 | 80 | 19.0 | 3/220 | 3/220 | 0/220 | 0/220 | x |

In the table, o indicates "good at both 350° C. and 500° C., Δ indicates good at 350° C. but a crack or cracks were caused at the dielectric layer at 500° C.". x indicates "a crack or cracks were caused at the lower electrode layer at either of 350° C. and 500° C.". "PASSED/SAMPLES" means the number of samples passed the test/ the total number of samples subjected to the test.

It will be understood from Table III that, in case the Ni content of the Ni—Fe alloy is 30~70%, the alloy is resistant to heating at a maximum temperature of 500° C. It is considered that this is because in case the Ni content exceeds 70% the coefficient of thermal expansion of the alloy is approximated to that of Ni and the difference in thermal expansion between the lower electrode surface layer section 2c and the thin-film dielectric layer 3 becomes large, whereas in case the Ni content is equal to or lower than 70% such a difference of thermal expansion is within an allowable range.

Accordingly, by using a Ni—Fe alloy having such a composition, it becomes possible to form a thin-film condenser which is resistant to heating at the temperature of 500° C. or higher, at low cost.

were tested for the heat resistance in the manner similar to that of the above described example 1.

The result of the test at the maximum temperature of 350° C. and 500° C. is shown in Table IV.

From Table IV, it will be seen that in case of heating at the temperature of 350° C. an alloy having a Ni content of 30% or more possesses a good heat resistance.

It is considered that this is because, similarly to example 2, the Ni—Fe alloy does not cause grain growth and has a relatively small coefficient of thermal expansion so that the difference of thermal expansion between the lower electrode layer 2 and the thin-film dielectric layer 3 does not become so large.

Further, it will be seen from Table IV that in case of heating at the temperature of 500° C. a preferable result is obtained when the Ni content is in a narrower range of 40~70%.

It is considered that this is because the lower electrode surface layer section 2c has a suitable coefficient of thermal expansion with respect to both of the thin-film dielectric layer 3 and the lower electrode base layer section 2b.

However, it will be understood that in case the Ni content is in the range of 40~70%, a resistance to heating at the temperature of 500° C. or higher is obtained irrespective of the material of the lower electrode base layer section 2b, and in case the Ni content is in the range of 30~70% a resistance to heating at the temperature of 500° C. can be attained when the coefficient of thermal expansion of the lower electrode base layer section 2b is equal to or approximate to that of the lower electrode surface layer section 2c.

TABLE IV

| SAMPLE No. | MATERIAL OF SURFACE/ LAYER SECTION Ni % | Fe % | COEFICIENT OF THERMAL EXPANSION ($\times 10^{-6}$/K) 273–373K | MAXIMUM TEMP. 350° C. INSULATION RESISTANCE PASSED/ SAMPLES | APPEARANCE PASSED/ SAMPLES | 500° C. INSULATION RESISTANCE PASSED/ SAMPLES | APPEARANCE PASSED/ SAMPLES | JUDGE-MENT |
|---|---|---|---|---|---|---|---|---|
| 16 | 100 | 0  | 13.3 | 220/220 | 220/220 | 112/220 | 130/220 | Δ |
| 17 | 90  | 10 | 12.8 | 218/218 | 218/218 | 111/218 | 120/218 | Δ |
| 18 | 80  | 20 | 12.2 | 219/219 | 219/219 | 110/219 | 118/219 | Δ |
| 19 | 70  | 30 | 12.0 | 223/223 | 223/223 | 223/223 | 223/223 | o |
| 20 | 60  | 40 | 11.8 | 218/218 | 218/218 | 218/218 | 218/218 | o |
| 21 | 50  | 50 | 10.0 | 215/215 | 215/215 | 215/215 | 215/215 | o |
| 22 | 40  | 60 | 6.0  | 220/220 | 220/220 | 220/220 | 220/220 | o |
| 23 | 35  | 65 | 1.3  | 216/216 | 216/216 | 0/216   | 0/216   | x |
| 24 | 30  | 70 | 8.0  | 217/217 | 217/217 | 187/217 | 200/217 | Δ |
| 25 | 25  | 75 | 17.0 | 10/208  | 10/208  | 0/208   | 0/208   | x |
| 16 | 20  | 80 | 19.0 | 3/225   | 3/225   | 0/225   | 0/225   | x |

In the table, o indicates "good at both 350° C. and 500° C., Δ indicates good at 350° C. but a crack or cracks were caused at the dielectric layer at 500° C.".
x indicates "a crack or cracks were caused at the lower electrode layer at either of 350° C. and 500° C.". "PASSED/SAMPLES" means the number of samples passed the test/ the total number of samples subjected to the test.

That is, in case the Ni content is around 35%, the coefficient of thermal expansion is in the range where it becomes extremely smaller as will be seen from FIG. 5. Accordingly, the difference in thermal expansion between the lower electrode surface layer 2c and the thin-film dielectric layer 3 does not cause any problem but the difference of thermal expansion between the lower electrode surface layer section 2c and the lower electrode base layer section 2b made of Cu becomes larger. Due to this, by the cause of the thickness relationship between the both, a crack or cracks were caused between the base layer section 2b and the surface layer section 2c.

This will be understood from the fact that in case of the sample No. 23 of the Ni content of 35% all of the samples were defective, whereas in case of the sample No. 24 of the Ni content of 30% a yield rate to a certain extend could be retained.

From the foregoing, the following can be obtained by putting together the test results of the examples 2 and 3 shown in Tables III and IV.

That is, in case the lower electrode surface layer section 2c is formed of a Ni—Fe alloy, it will do for heating at the temperature of 350° C. that the Ni content is equal to or larger than 30%.

On the other hand, for the heating at the temperature of 500° C., there may be caused such a case in which a crack or cracks are caused in the lower electrode layer when the Ni content is smaller than 40% or exceeds 70%.

The Ni—Fe alloy is low-priced and enables the plating layer(i.e., the lower electrode surface layer section) to be formed thereon uniformly whilst being capable of varying its coefficient of thermal expansion in accordance with the kind and the thickness of the thin-film dielectric layer and the material of the lower electrode base layer section, by varying its composition.

Accordingly, a Ni—Fe alloy is particularly suited for the lower electrode surface layer section of the thin-film condenser of the present invention.

In the meantime, also in case of this example, several percentages of Co is contained as impurity in connection with Ni component of Ni—Fe alloy similarly as described above. Accordingly, the Ni content (weight percentage) herein referred to includes the content of Co.

Example 4

In connection with the case where the thin-film dielectric layer 3 is formed of $TiO_2$ and $SrTiO_2$ by reactive sputtering in place of $Ta_2O_5$, a thin-film condenser 10 was produced by forming the lower electrode surface layer section 2c of a Ni—Fe alloy (50% Ni) and in the manner similar to the above described example 1 and tested for the heat resistance (samples Nos. 27 and 28).

TABLE V

| | SAMPLE No. | MAX TEMP. K | MATERIAL OF LOWER ELECTRODE SURFACE LAYER SECTION 2c | MATERIAL OF DIERECTRIC | COEFICIENT OF THERMAL EXPANSION ×10⁻⁶/K (272–373K) | INSULATION RESISTANCE SAMPLES | APPEARANCE SAMPLES |
|---|---|---|---|---|---|---|---|
| INVENTION | 27 | 350 | Ni(55%)—Fe | TiO2 | 9.0 | 220/220 | 220/220 |
|  | 28 |  | Ni(50%)—Fe | SrTiO3 | 10.0 | 218/218 | 218/218 |
| COMPARATIVE EXAMPLE | 29 |  | Cu | TiO2 | 16.2 | 0/225 | 0/225 |
|  | 30 |  | " | SrTiO3 | 16.2 | 0/223 | 0/223 |
| INVENTION | 27 | 500 | Ni(55%)—Fe | TiO2 | 9.0 | 220/220 | 220/220 |
|  | 28 |  | Ni(50%)—Fe | SrTiO3 | 10.0 | 218/218 | 218/218 |
| COMPARATIVE EXAMPLE | 29 |  | Cu | TiO2 | 16.2 | 0/225 | 0/225 |
|  | 30 |  | " | SrTiO3 | 16.2 | 0/223 | 0/223 |

Further, by forming the dielectric layer of $TiO_2$ and $SrTiO_3$ and forming the lower electrode surface layer section 2c of Cu similarly to the comparative example (sample No 4) in case of example 1, comparative examples were produced and tested for the heat resistance (samples Nos. 29 and 30).

The test result is shown in Table V.

As will be apparent from the result shown in Table V, even in the case where $TiO_2$ or $SrTiO_3$ is used for forming the thin-film dielectric layer in place of $Ta_2O_5$, it becomes possible to prevent grain growth and reduce the difference of thermal expansion between the lower electrode surface layer section 2c and the thin-film dielectric layer 3 for thereby improving the heat resistance by using a Ni—Fe alloy or the like metal of a high recrystallization temperature Tr for forming the lower electrode surface layer section in place of Cu of a low recrystallization temperature Tr.

In the meantime, the thin-film dielectric which can be used for the thin-film condenser of this invention is not limited to the above described three kinds but various kinds of thin-film dielectrics can be used, for example, $SiO_2$, $Si_3N_4$, $(Sr, Br)TiO_3$, etc. can be enumerated.

Of those dielectrics, $Ta_2O_5$, $TiO_2$, $SrTiO_3$ and $(Sr, Br)TiO_3$ are relatively large in dielectric constant and thus advantageous when used for a condenser of a large capacity.

Of those dielectrics, $SrTiO_3$ and $(Sr, Br)TiO_3$ is particularly high in dielectric constant.

Further, for example, $Ta_2O_5$ has a positive capacitive temperature coefficient of about +250 ppm/°C., while on the other hand $TiO_2$ and $SrTiO_3$ have negative capacitive temperature coefficients of about −700 ppm/°C. and about −3000 ppm/°C., respectively, so it will do to select a suitable dielectric material according to a required characteristic of the condenser, the method of manufacture, etc.

For example, by operating a semiconductor device, a resulting heat is transmitted to the condenser 10 to increase the temperature thereof. Accordingly, $Ta_2O_5$ whose electrostatic capacity becomes higher under the condition where the semiconductor device is in operation is desirable for use as a decoupling condenser for removing noise.

Further, while in the above described examples the lower electrode base layer section 2b, the lower electrode surface layer section 2c, the upper electrode base layer section 4b and the upper electrode surface layer section 4c are formed by electroplating, another method such as vapor deposition, sputtering, CVD (chemical-vapor deposition), etc. can be used for this end, and furthermore electroless plating may be used.

Electroplating effects an easy treatment of product and is suited for mass production with a simple equipment. Further, electroless plating has an advantage of being capable of forming an electrode on a pattern which is electrically independent (i.e., insulated).

Further, both electroplating and electroless plating can increase the thickness of each layer sections with easy and have a leveling characteristic that in case the insulation substrate has a recess due to a surface defect such as a pore, flaw, etc. they can fill up the recess to make the surface of the insulation substrate smoother, thus being effective of reducing the short circuit defect of the condenser which is caused by contact or abnormal approximation of the upper and lower electrode layers due to a defect of the insulation substrate.

Accordingly, by forming at least the lower electrode surface layer by plating, the short circuit defect, etc. caused by a surface damage, etc. of the insulation substrate can be reduced, and the insulation of the condenser and the yield rate can be increased.

On the other hand, by sputtering, it is difficult to increase the thickness of each layer, but in case a surface of an insulation substrate has a few surface defects like a glass substrate the dielectric layer 3 and the upper electrode 4 can be formed successively to the lower electrode layer 2. So, sputtering has an advantage that it can resultantly reduce the cost.

While in the above described examples the lower electrode connecting layer section 2a and the upper electrode connecting layer section 4a are produced by sputtering, it will do to use vapor deposition, CVD (chemical-vapor deposition), etc. Further, as the activation process for electroless plating, solutions of PdCl or the like can be adopted in substitution.

In each of the above described examples, a ceramic substrate made of alumina is used as an insulation substrate 1, the insulation substrate is not limited to that made of alumina but may be a ceramic substrate made of AlN, mullite, glass ceramic, silicon carbide, forsterite, glass, or the like.

Of those materials, AlN, mullite, glass ceramic, silicon carbide, etc. are smaller in coefficient of thermal expansion than alumina, so while Cu or the like may be used for the lower electrode base layer 2b, the material used can be altered suitably, for example, Ni—Fe is used depending on a required heat-resisting temperature and considering the resistance of the eletrode.

While according to the present invention Pt, Ni—Fe alloy, or the like is used for the lower electrode surface layer 2c only, it is apparent that, if Pt, Ni—Fe alloy or the like is also used for the upper electrode base layer 4b which is formed in proximity to the thin-film dielectric layer 3 similarly in the upper electrode layer 4, damage of the dielectric layer 3 can further be prevented. This is effective particularly in case the upper electrode is not divided or in case the small electrodes divided are large-sized.

Further, other than Pt, Ni—W alloy, Ni—Fe alloy, etc. enumerated in the above examples, Fe—Ni—Co alloy represented by Kovar (29Ni-17Co—Fe), Fe—Ni—Cr alloy or the like which is Obtained by adding Co or Cr into Ni—Fe alloy as a third constituent. In case of these alloys, a low coefficient of thermal expansion can be obtained and its value can be varied depending upon a variation of the composition. However, in case the electrode layer is formed by plating, there is a tendency that the more the components increase in number the more difficult the manage and control of plating solution becomes, so a suitable material may be selected considering the characteristics of the electrode, etc.

From the foregoing, it will be apparent that according to the present invention by using a lower electrode surface layer section made of a metal having a high recrystallization temperature Tr or a high melting point Tm, it becomes possible to prevent grain growth of a lower electrode surface layer section at the time of heating for thereby preventing damage of a thin-film dielectric layer which is otherwise caused by movement of atoms accompanied by grain growth of the heated lower electrode surface layer section, whereby it becomes possible to form a thin-film condenser having a high heat-resisting property.

It will be further understood that by using a metal of a low coefficient of thermal expansion for a lower electrode surface layer it becomes possible to reduce the difference of thermal expansion between the lower electrode surface layer section and the thin-film dieletric layer, thus enabling the thin-film condenser to have a higher heat-resisting property.

It will be further understood that in case a lower electrode surface layer section is made of a Ni—Fe alloy containing 30% or more Ni, it becomes possible to make the heat-resisting property of the condenser optimum and make the condenser low-priced by selecting a suitable Ni content depending upon the materials of a thin-film dielectric layer, insulation substrate, etc.

It will be further understood that in case a lower electrode surface layer section and lower electrode base layer section are made of Ni—Fe alloy containing 30~70% Ni it becomes possible to reduce a thermal stress between the lower electrode surface layer section and the thin-film dielectric layer and prevent occurrence of thermal stress between the lower electrode surface layer section and the lower electrode base layer section or at least reduce the same, thus making it possible to attain a heat-resisting property of 500° C. or higher.

It will be further understood that in case a lower electrode surface layer section is made of a Ni—Fe alloy containing 40~70% of Ni it becomes possible to attain a heat-resisting property of 500° C. or higher.

What is claimed is:

1. A thin-film condenser comprising:

a lower electrode layer formed on an insulation substrate;

a thin-film dielectric layer formed on said lower electrode layer; and an upper electrode layer formed on said thin-film dielectric layer;

wherein said lower electrode layer includes a lower electrode surface layer section forming a surface in contact with said thin-film dielectric layer, and said lower electrode surface layer comprises a metal having a recrystallization temperature within the range of 623 K. to 933 K.

2. A thin-film condenser according to claim 1, wherein said metal comprising said lower electrode surface layer section has a coefficient of thermal expansion equal to or lower than $13 \times 10^{-6}$/K.

3. A thin-film condenser according to claim 1, wherein said lower electrode surface layer section is formed of Ni.

4. A thin-film condenser according to claim 1, wherein said lower electrode surface layer section is formed of Pt.

5. A thin-film condenser comprising:

a lower electrode layer formed on an insulation substrate;

a thin-film dielectric layer formed on said lower electrode layer;

an upper electrode layer formed on said thin-film dielectric layer;

wherein said lower electrode layer includes a lower electrode surface layer section forming a surface in contact with said thin-film dielectric layer, and said lower electrode surface layer comprises a metal having a melting point equal to or higher than 1780 K.

6. A thin-film condenser according to claim 5, wherein said metal comprising said lower electrode surface layer section has a coefficient of thermal expansion equal to or lower than $13 \times 10^{-6}$/K.

7. A thin-film condenser as claimed in claim 5, wherein said lower electrode layer has at least two layers.

8. A thin-film condenser as claimed in claim 5, wherein said lower electrode layer has at least three layers.

9. A thin-film condenser as claimed in claim 8, wherein said lower electrode layer comprises a lower electrode connecting layer, a lower electrode base layer, and said lower electrode surface layer.

10. A thin-film condenser as claimed in claim 9, wherein each of said layers of said lower electrode layer is formed by sputtering or by electroplating.

11. A thin-film condenser as claimed in claim 5, wherein said thin-film dielectric layer comprises $Ta_2O_5$.

12. A thin-film condenser as claimed in claim 5, wherein said upper electrode layer comprises at least two layers.

13. A thin-film condenser as claimed in claim 5, wherein said upper electrode layer comprises at least three layers.

14. A thin-film condenser as claimed in claim 5, wherein said upper electrode layer includes an upper electrode connecting layer having a photoresist pattern formed thereon.

15. A thin-film condenser as claimed in claim 5, wherein said upper electrode layer is divided so as to constitute a plurality of condenser sections.

16. A thin-film condenser according to claim 5, wherein said lower electrode surface layer section is formed of Pt.

17. A thin-film condenser according to claim 5, wherein said lower electrode surface layer section is formed of a Ni—W alloy.

18. A thin-film condenser comprising:

a lower electrode layer formed on an insulation substrate;

a thin-film dielectric layer formed on said lower electrode layer; and an upper electrode layer formed on said thin-film dielectric layer;

wherein said lower electrode layer includes a lower electrode surface layer section forming a surface in contact with said thin-film dielectric layer comprises a Ni—Fe alloy containing at least 30% of Ni.

19. A thin-film condenser according to claim 18, wherein said lower electrode surface layer section of said lower electrode layer is made of a Ni—Fe alloy containing 30~70% of Ni.

20. A thin-film condenser according to claim 18, wherein said lower electrode layer further includes a lower electrode base layer section located between said lower electrode surface layer section and said insulation substrate, said lower electrode base layer comprising a Ni—Fe alloy containing 30~70% of Ni.

21. A thin-film condenser according to claim 18, wherein said lower electrode surface layer section of said lower electrode layer is made of a Ni—Fe alloy containing 40~70% of Ni.

* * * * *